(12) United States Patent
Wang et al.

(10) Patent No.: US 10,518,208 B2
(45) Date of Patent: Dec. 31, 2019

(54) METHODS AND APPARATUSES FOR DETECTING PARAMETER FOR AIR PURIFIER

(71) Applicant: Xiaomi Inc., Beijing (CN)

(72) Inventors: Yang Wang, Beijing (CN); Qiang Fu, Beijing (CN); Enxing Hou, Beijing (CN)

(73) Assignee: XIAOMI INC., Beijing (CN)

( * ) Notice: Subject to any disclaimer, the term of this patent is extended or adjusted under 35 U.S.C. 154(b) by 438 days.

(21) Appl. No.: 15/359,126

(22) Filed: Nov. 22, 2016

(65) Prior Publication Data

US 2017/0144097 A1    May 25, 2017

(30) Foreign Application Priority Data

Nov. 25, 2015    (CN) .......................... 2015 1 0834129

(51) Int. Cl.
| | | |
|---|---|---|
| *B01D 46/44* | (2006.01) | |
| *F24F 11/77* | (2018.01) | |
| *F24F 11/30* | (2018.01) | |
| *F24F 3/16* | (2006.01) | |
| *B01D 46/42* | (2006.01) | |
| *F24F 110/50* | (2018.01) | |
| *F24F 11/39* | (2018.01) | |
| *F24F 110/52* | (2018.01) | |

(52) U.S. Cl.
CPC ........... *B01D 46/44* (2013.01); *B01D 46/429* (2013.01); *F24F 3/1603* (2013.01); *F24F 11/30* (2018.01); *F24F 11/77* (2018.01); *F24F 11/39* (2018.01); *F24F 2110/50* (2018.01); *F24F 2110/52* (2018.01)

(58) Field of Classification Search
CPC ....... B01D 46/44; B01D 46/429; F24F 11/77; F24F 11/30; F24F 3/1603; F24F 2110/50; F24F 2110/52; F24F 11/39
See application file for complete search history.

(56) References Cited

FOREIGN PATENT DOCUMENTS

| | | |
|---|---|---|
| CN | 103105195 A | 5/2013 |
| CN | 203436970 U | 2/2014 |
| CN | 103912964 A | 7/2014 |
| CN | 103925676 A | 7/2014 |
| CN | 104315647 A | 1/2015 |
| CN | 104315660 A | 1/2015 |
| CN | 104456831 A | 3/2015 |
| CN | 104848475 A | 8/2015 |
| CN | 105387566 A | 3/2016 |
| EP | 3015779 A1 | 5/2016 |

(Continued)

OTHER PUBLICATIONS

Extended European Search Report issued in corresponding EP Application No. EP16200698, dated Mar. 30, 2017, 8 pages.

(Continued)

*Primary Examiner* — Robert Clemente
(74) *Attorney, Agent, or Firm* — Arch & Lake LLP

(57) ABSTRACT

Methods and apparatuses are provided for detecting parameter. The method includes: acquiring at least one intake air quality parameter of an air intake area of an air purifier and at least one output air quality parameter of an air discharging area of the air purifier; determining a purification parameter corresponding to the intake air quality parameter of the air intake area and the output air quality parameter of the air discharging area; and outputting the purification parameter.

20 Claims, 9 Drawing Sheets

Acquiring at least one air quality parameter of an air intake area of an air purifier and at least one air quality parameter of an air discharging area of the air purifier — 101

Determining a purification parameter corresponding to the air quality parameter of the air intake area and the air quality parameter of the air discharging area — 102

Outputting the purification parameter — 103

(56) References Cited

FOREIGN PATENT DOCUMENTS

| JP | 02103449 A | 4/1990 |
|---|---|---|
| JP | 2000177379 A | 6/2000 |
| JP | 2011112283 A | 6/2011 |
| JP | 2015124926 A | 7/2015 |
| WO | 2015146148 A1 | 10/2015 |

OTHER PUBLICATIONS

First Office Action (including English translation) issued in corresponding Japanese Application No. 2016-564131 dated Jan. 9, 2018, 9 pages.

International Preliminary Report on Patentability (including English translation) dated May 29, 2018 for International Application No. PCT/CN2016/082687, 11 pages.

English translation of Office Action issued in corresponding Chinese Patent Application No. 2015108341297, dated Oct. 27, 2016, 8 pages.

International Search Report issued in corresponding PCT Application No. PCT/CN/2016/082687, dated Aug. 31, 2016, 13 pages.

METHODS AND APPARATUSES FOR DETECTING PARAMETER FOR AIR PURIFIER

CROSS-REFERENCE TO RELATED APPLICATION

This application is based on and claims priority of the Chinese Patent Application No. 201510834129.7, filed on Nov. 25, 2015, which is incorporated herein by reference in its entirety.

TECHNICAL FIELD

The present disclosure is related to the technical field of smart home appliances, and more particularly, to methods and apparatuses for detecting parameter for an air purifier.

BACKGROUND

As industrialization advances, environmental pollution becomes more severe, and people are paying more attention to their living environments. Accordingly, air purifiers which purify indoor air are becoming more popular. An air purifier sucks in ambient air by an air intake fan, purifies the sucked air by a filter element, and then outputs the purified air by an air discharging fan. Users can insert different filter elements in the air purifier to meet various demands, such as dust filtering and deodorization. However, in the related arts, it is difficult to measure purification parameters of air purifiers.

SUMMARY

According to a first aspect of the present disclosure, there is provided a parameter detecting method for an air purifier. In the method, the air purifier acquires at least one intake air quality parameter of an air intake area of the air purifier and at least one output air quality parameter of an air discharging area of the air purifier. The air purifier determines a purification parameter corresponding to the at least one intake air quality parameter of the air intake area and the at least one output air quality parameter of the air discharging area. The air purifier outputs the purification parameter.

According to a second aspect of the present disclosure, there is provided a parameter detecting apparatus for an air purifier. The apparatus may include: a quality parameter acquiring module configured to acquire at least one intake air quality parameter of an air intake area of the air purifier and at least one output air quality parameter of an air discharging area of the air purifier; a purification parameter determining module configured to determine a purification parameter corresponding to the at least one intake air quality parameter of the air intake area and the at least one output air quality parameter of the air discharging area; and a purification parameter outputting module configured to output the purification parameter.

According to a third aspect of the present disclosure, there is provided a terminal that includes: a processor and a memory storing instructions executable by the processor. The processor is configured to: acquire at least one intake air quality parameter of an air intake area of an air purifier and at least one output air quality parameter of an air discharging area of the air purifier; determine a purification parameter corresponding to the at least one intake air quality parameter of the air intake area and the at least one output air quality parameter of the air discharging area; and output the purification parameter.

According to a fourth aspect of the present disclosure, there is provided a non-transitory computer-readable storage medium having stored therein instructions that, when executed by a processor of a mobile terminal, causes the mobile terminal to perform acts including: acquiring at least one intake air quality parameter of an air intake area of the air purifier and at least one output air quality parameter of an air discharging area of the air purifier; determining a purification parameter corresponding to the at least one intake air quality parameter of the air intake area and the at least one output air quality parameter of the air discharging area; and outputting the purification parameter.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Reference will now be made in detail to embodiments, examples of which are illustrated in the accompanying drawings. The following description refers to the accompanying drawings in which the same numbers in different drawings represent the same or similar elements unless otherwise presented. The embodiments set forth in the following description of embodiments do not represent all embodiments consistent with the disclosure. Instead, they are merely examples of apparatuses and methods consistent with aspects related to the disclosure as recited in the appended claims.

The terms used herein are for the purpose of illustrating the embodiments only, rather than limiting the present disclosure. The terms "a", "said" and "the" of singular forms used in the present description and the attached claims are also intended to include their plural forms, unless otherwise clearly specified in the context. It can also be appreciated that the term "and/or" as used herein refers to any or all possible combinations of one or more associated items as listed.

It can be appreciated that, while the terms "first", "second", "third" and so on may be used herein to describe various information, such information is not limited to these terms, which are only used to distinguish between different information of the same category. For example, the first information can also be referred to as the second information, and similarly the second information can also be referred to as the first information, without departing from the scope of the present disclosure. Depending on the context, the term "if" as used herein may be interpreted as "when", "while", or "in response to determining."

Figure 1:
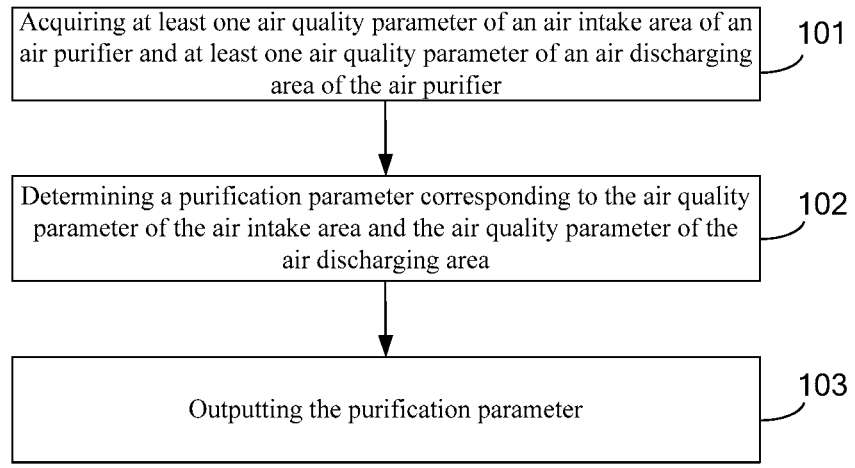
FIG. 1 is a flow chart showing a parameter detecting method for an air purifier according to an embodiment.

FIG. 1 is a flow chart showing a parameter detecting method for an air purifier according to an embodiment. As shown in FIG. 1, the method may be implemented in the air purifier. Alternatively or additionally, the method may be applied in a terminal. The method may include at least the following steps 101-103.

In step 101, at least one air quality parameter of an air intake area of the air purifier and at least one air quality parameter of an air discharging area of the air purifier are acquired.

In step 102, a purification parameter corresponding to the at least one air quality parameter of the air intake area and the at least one air quality parameter of the air discharging area is determined.

In step 103, the purification parameter is output.

The terminal in the embodiments of this disclosure may be a terminal wirelessly connected to (for example, having been bound to) the air purifier, and may include a smart handset, a tablet computer, a personal digital assistant or the like. A user of the terminal may log on a preset application (such as a smart home application) installed in the terminal by using a logon account, and then start a parameter detecting process for the air purifier. The terminal in the embodiments of this disclosure may also be the air purifier itself or another device associated with the air purifier. For example, the terminal may be a second air purifier or other smart home device connected to the smart home including the air purifier.

By acquiring at least one intake air quality parameter of an air intake area of an air purifier and at least one output air quality parameter of an air discharging area of the air purifier and then determining and outputting a purification parameter corresponding to the at least one intake air quality parameter of the air intake area and the at least one output air quality parameter of the air discharging area, the purification parameter of the air purifier can be detected quickly and accurately. Accordingly, the purification performance of the air purifier can be acquired quickly and accurately, thereby providing reliable bases for controlling and improving the air purifier.

Regarding step 101, the at least one air quality parameter may include at least one of a particulate matter (PM) concentration, a toxic gas concentration, and a bacteria concentration. The particulate matter may include pollutant particles in the air, such as PM2.5 substances, dust grains, dust powder, smog and the like.

Figure 2:
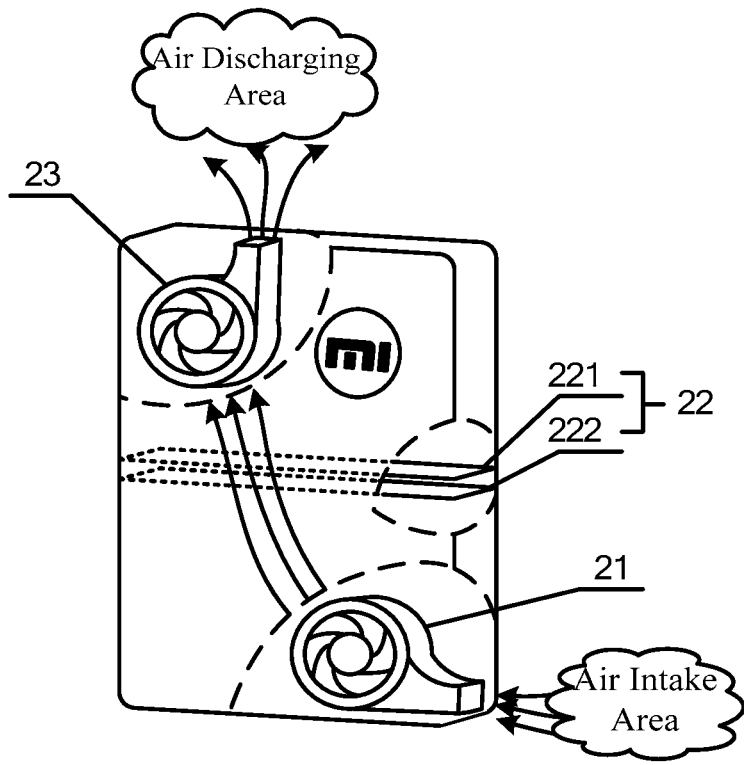
FIG. 2 is a schematic structural view of an air purifier according to an embodiment.

The air purifier in the embodiments of this disclosure may be shown in FIG. 2, and may include an air intake fan 21, a filter element 22, and an air discharging fan 23. The air intake fan 21 sucks air at an air intake port into the air purifier. The sucked air is purified by the filter element 22 and then blown out by the air discharging fan 23 via an air outlet. The air intake area may be located near a bottom surface of the air purifier while the air discharging area may be located near an upper surface of the air purifier.

The filter element 22 may include one or more layers of screens. Each layer of screen may realize one or more functions, including dedusting, high efficiency particulate air filtering, deodorization, formaldehyde scavenging etc. For example, the filter element 22 in FIG. 2 includes a first screen 221 and a second screen 222. Assume the first screen 221 has a dedusting function, and the second screen 222 has deodorization and formaldehyde scavenging functions. As an example, the first screen 221 and the second screen 222 in FIG. 2 are integrally formed. To realize dedusting, deodorization and formaldehyde scavenging functions, the air purifier must utilize the filter element 22 as a whole. As another example, the first screen 221 and the second screen 222 in FIG. 2 may be independently formed, so that they can be used independently or simultaneously. The functions of the filter screen 22 may be set as needed by the user by, for example, pressing function buttons on the air purifier or by utilizing a terminal wirelessly connected to the air purifier, or may be set automatically by the air purifier.

The air intake area may be a spatial area where an air inlet corresponding to the air intake fan 21 is located. The air discharging area may be a spatial area where an air outlet corresponding to the air discharging fan 23 is located. In other embodiments of this disclosure, the air intake area may be a spatial area located at a first preset distance from the air inlet, and the air discharging area may be a spatial area located at a second preset distance from the air outlet.

In one or more embodiments of this disclosure, acquiring the at least one air quality parameter of the air intake area of the air purifier and the at least one air quality parameter of the air discharging area of the air purifier may include: receiving at least one first air quality parameter generated by an air quality detecting device provided at the air intake area; and receiving at least one second air quality parameter generated by an air quality detecting device provided at the air discharging area. By receiving air quality parameters generated by the air quality detecting devices, the air quality parameters can be measured quickly and accurately, and the efficiency of measuring the purification parameter can be improved accordingly.

The air quality detecting device may include at least one of a dust meter, a particle counter, a toxic gas concentration measuring sensor, and a turbidimeter.

Regarding step 102, the purification parameter may be the purification efficiency of the filter element of the air purifier. Correspondence relations or a conversion model may be established in advance between sets of values of the at least one air quality parameter of the air intake area of the air purifier and the at least one air quality parameter of the air discharging area of the air purifier and values of the purification parameter.

The correspondence relations or the conversion model may include correspondence relations or a conversion model between sets of values of each air quality parameter of the air intake area of the air purifier and a corresponding air quality parameter of the air discharging area of the air purifier and values of the purification parameter. Alternatively or additionally, the correspondence relations or the conversion model may be between sets of values of multiple air quality parameters of the air intake area of the air purifier and multiple corresponding air quality parameters of the air discharging area of the air purifier and values of the purification parameter.

If the correspondence relations or the conversion model established in advance are/is the correspondence relations or the conversion model between sets of values of multiple air quality parameters of the air intake area of the air purifier and multiple corresponding air quality parameters of the air discharging area of the air purifier and values of the purification parameter, a weight of each air quality parameter in the correspondence relations or the conversion model may be set so as to acquire the corresponding purification parameter.

In an embodiment of this disclosure, after determining the purification parameter corresponding to the at least one air quality parameter of the air intake area and the at least one air quality parameter of the air discharging area, the method further includes: performing control of the air purifier based on the purification parameter, the control including adjusting a fan rotational speed and/or an operation mode of the air purifier. By performing control of the air purifier based on the purification parameter, the control efficiency and intelligent level of the air purifier can be improved, a better purification effect can be achieved and user experience can be enhanced.

Correspondence relations between values of the purification parameter and control measures may be established in advance. Adjusting the fan rotational speed may include adjusting rotational speeds of the air intake fan 21 and the air discharging fan 23 independently. Adjusting the operation mode of the air purifier may include adjusting it to an automatic mode, a sleeping mode and a powerful mode. For example, if the purification parameter is lower than a preset purification threshold, the air purifier is adjusted to its powerful mode to increase its purification power.

Regarding step 103, outputting the purification parameter may include outputting the purification parameter to a control interface for the air purifier. By doing so, the purification performance of the air purifier can be conveniently presented to users, and user experience can be effectively enhanced. The purification parameter may also be output using voice output technologies.

Figure 3:
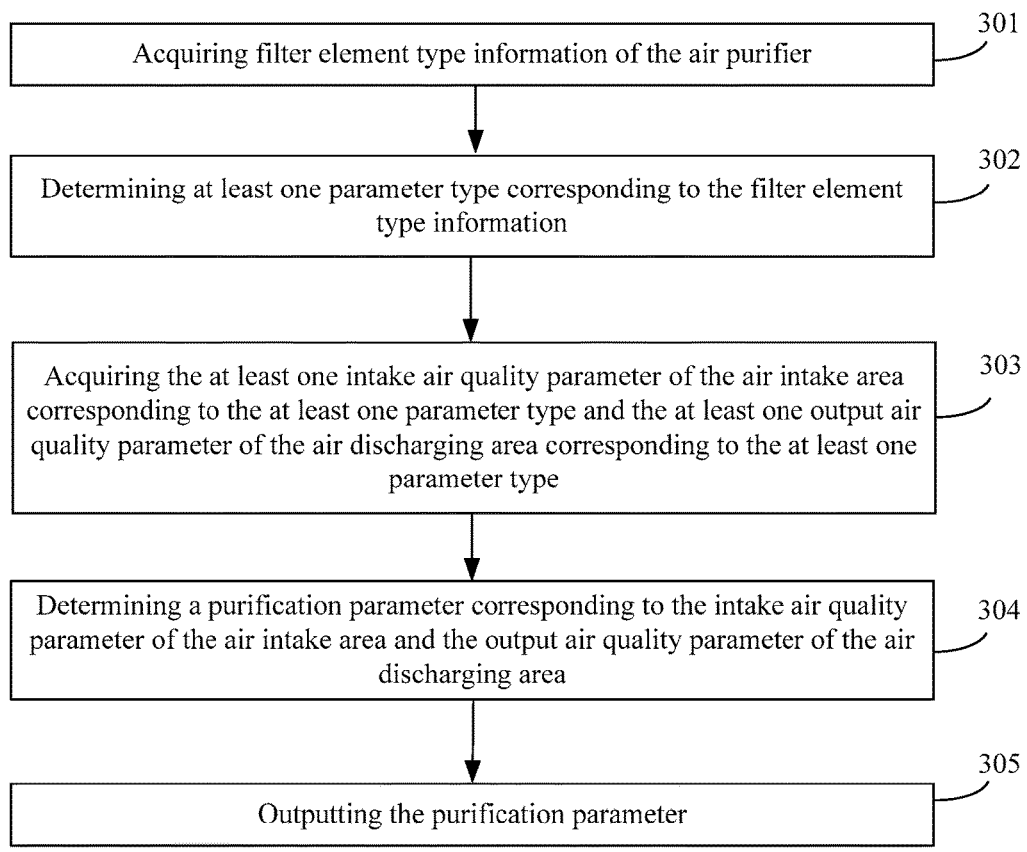
FIG. 3 is a flow chart showing a parameter detecting method for an air purifier according to another embodiment.

FIG. 3 is a flow chart showing a parameter detecting method for an air purifier according to another embodiment. As shown in FIG. 3, the method includes steps 301-305.

In step 301, filter element type information of the air purifier is acquired.

In step 302, at least one parameter type corresponding to the filter element type information is determined.

In step 303, the at least one intake air quality parameter of the air intake area corresponding to the at least one parameter type and the at least one output air quality parameter of the air discharging area corresponding to the at least one parameter type are acquired.

In step 304, a purification parameter corresponding to the at least one intake air quality parameter of the air intake area and the at least one output air quality parameter of the air discharging area is determined. This step is similar to step 102 in FIG. 1, and will not be repeated.

In step 305, the purification parameter is output. This step is similar to step 103 in FIG. 1, and will not be repeated.

In the above embodiment of this disclosure, based on the filter element type information of the air purifier, the corresponding type of air quality parameters of the filter element can be acquired quickly and accurately, and the efficiency of detecting the purification parameter can be improved.

In the embodiments of this disclosure, the filter element in the air purifier may realize a single function or multiple functions. The filter element type information may include at least one of a dedusting type, a high efficiency particulate air filtering type, a deodorization type, and a formaldehyde scavenging type. The at least one parameter type is at least one type of the at least one air quality parameter, and may include at least one of a particulate matter (PM) type, a toxic gas type and a bacteria type.

As an example implementation, the filter element of the air purifier may include an integrated structure that is capable of simultaneously realizing multiple functions, such as dedusting, deodorization, and formaldehyde scavenging, but cannot selectively realize one of the functions. In this case, the air purifier may acquire the filter element type information in real time, or acquire and record the filter element type information after the filter element is installed in the air purifier for the first time so that such information may not be acquired in real time. Accordingly, the at least one air quality parameter includes a PM concentration, an odorous gas concentration and a formaldehyde concentration.

As another example implementation, the filter element of the air purifier may include discrete parts capable of realizing respective functions. For example, the filter element may include screens that support dedusting, deodorization, and formaldehyde scavenging respectively, and one or more or all of the screens may be used selectively. In this case, the air purifier may acquire the filter element type information in real time according to the current usage condition. Accordingly, the at least one air quality parameter includes any one or more of a PM concentration, an odorous gas concentration and a formaldehyde concentration.

In the present embodiment, when the filter element type information changes, the characteristics of the filter element will change accordingly. Accordingly, the rotational speed of the fan is controlled to match with the filter element type information based on the purification parameter, after determining the purification parameter corresponding to the air quality parameter of the air intake area and the air quality parameter of the air discharging area. By doing so, the usage effect of the air purifier can better meet the actual usage requirements of users, thereby achieving better user experience.

Figure 4:
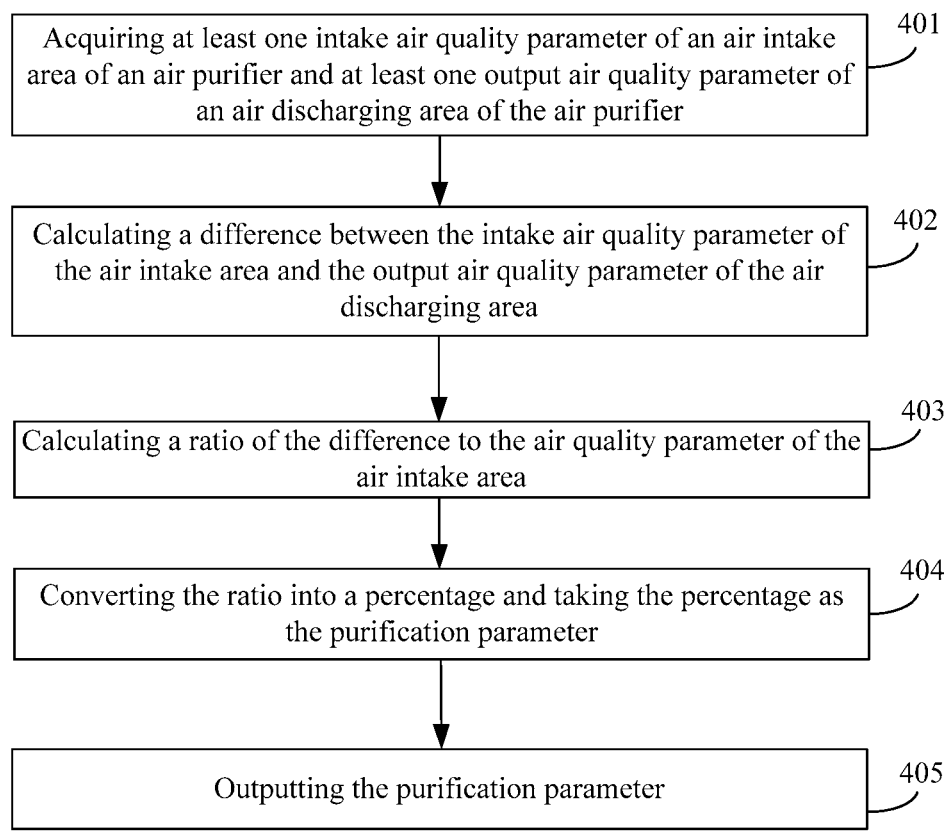
FIG. 4 is a flow chart showing a parameter detecting method for an air purifier according to yet another embodiment.

FIG. 4 is a flow chart showing a parameter detecting method for an air purifier according to yet another embodiment. As shown in FIG. 4, the method includes steps 401-405.

In step 401, at least one intake air quality parameter of an air intake area of the air purifier and at least one output air quality parameter of an air discharging area of the air purifier are acquired. This step is similar to step 102 in FIG. 1, and will not be repeated.

In step 402, a difference between the at least one intake air quality parameter of the air intake area and the at least one output air quality parameter of the air discharging area is calculated.

In step 403, a ratio of the difference to the at least one air quality parameter of the air intake area is calculated.

In step 404, the ratio is converted into a percentage and the percentage is taken as the purification parameter.

In step 405, the purification parameter is output. This step is similar to step 103 in FIG. 1, and will not be repeated.

In the present embodiment, by calculating a difference between the at least one air quality parameter of the air intake area and the at least one air quality parameter of the air discharging area, calculating a ratio of the difference to the at least one air quality parameter of the air intake area, and converting the ratio into a percentage and taking the percentage as the purification parameter, operations for detecting the purification parameter can be simplified, and the purification parameter can be detected quickly and accurately (namely, the detecting efficiency can be improved).

When the at least one air quality parameter includes at least two of: a PM concentration, a toxic gas concentration, and a bacteria concentration, a difference between each air quality parameter of the air intake area and the corresponding air quality parameter of the air discharging area is acquired. Further, a ratio of the difference to the air quality parameter of the air intake area may be calculated. And the ratio may be converted into a percentage and the percentage is taken as the purification parameter corresponding to the air quality parameter.

In other embodiments of this disclosure, steps 402-404 may be converted into a formula $V=(1-n1/n2)$, where V represents the purification parameter, n1 the air quality parameter of the air discharging area and n2 the air quality parameter of the air intake area. After the air quality parameter of the air intake area of the air purifier and the air quality parameter of the air discharging area of the air purifier are acquired, the purification parameter corresponding to the air quality parameter of the air intake area and the air quality parameter of the air discharging area can be determined by substituting the determined parameters in the above formula.

Figure 5:
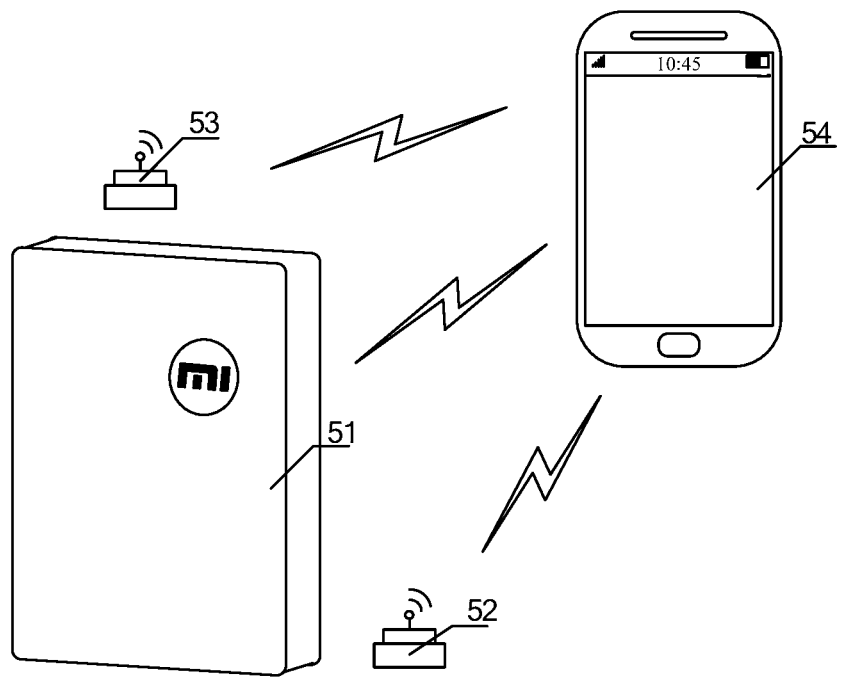
FIG. 5 is a schematic view of an application scenario where parameter detection for an air purifier is performed according to an embodiment.

FIG. 5 is a schematic view of an application scenario where parameter detection for an air purifier is performed according to an embodiment. The application scenario shown in FIG. 5 includes an air purifier 51, an air quality detecting device 52 provided at the air intake area, an air quality detecting device 53 provided at the air discharging area and a smart handset 54 acting as a purification parameter determining device. The air purifier 51, the air quality detecting device 52 and the air quality detecting device 53 are wirelessly connected to the smart handset 54 respectively, and information transmission and interaction can be performed among the four devices based on the wireless connection. It can be understood that the purification parameter determining device is exemplified as the smart handset 54 in this embodiment. In practical use, the purification parameter determining device may be a personal computer (PC), a tablet computer, a PDA or any other smart terminal.

In the application scenario shown in FIG. 5, the air quality detecting device 52 and the air quality detecting device 53 detect the air quality parameter of the air intake area and the air quality parameter of the air discharging area respectively, and transmit the detected air quality parameters to the smart handset 54. The smart handset 54 can determine and output a purification parameter corresponding to the received air quality parameters.

Further, the smart handset 54 may issue control instructions to control the air purifier.

In another application scenario of this disclosure, the air quality detecting device 52 and the air quality detecting device 53 may be respectively built in two wirelessly connected smart terminals, which are provided at the air intake area and the air discharging area respectively and detect the air quality parameters in an interactive manner and one of which may be a purification parameter determining device.

Other application scenarios of this disclosure may include only an air purifier 51 and air quality detecting devices 52, 53 that are built in the air purifier 51 or provided independent from the air purifier 51. The air quality detecting devices 52, 53 may transmit the detected air quality parameters to the air purifier 51. The air purifier 51 determines and outputs a purification parameter corresponding to the received air quality parameters.

Figure 6A:
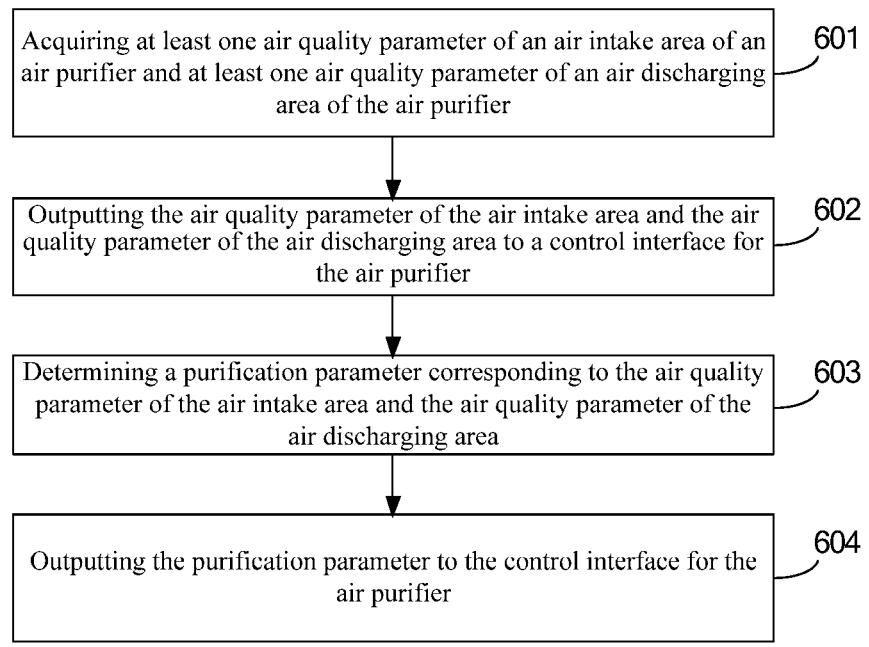
FIG. 6A is a flow chart showing a parameter detecting method for an air purifier according to yet another embodiment.

Regarding the above application scenario, FIG. 6A is a flow chart showing a parameter detecting method for an air purifier according to an embodiment. The method may comprise steps 601-604.

In step 601, at least one air quality parameter of an air intake area of the air purifier and at least one air quality parameter of an air discharging area of the air purifier are acquired.

In step 602, the air quality parameter of the air intake area and the air quality parameter of the air discharging area are output to a control interface for the air purifier.

In step 603, a purification parameter corresponding to the air quality parameter of the air intake area and the air quality parameter of the air discharging area is determined.

In step 604, the purification parameter is output to the control interface for the air purifier.

In this embodiment, by outputting the purification parameter and the air quality parameters to the control interface for the air purifier, the purification performance of the air purifier can be conveniently presented to users, and user experience can be effectively enhanced.

Figure 6B:
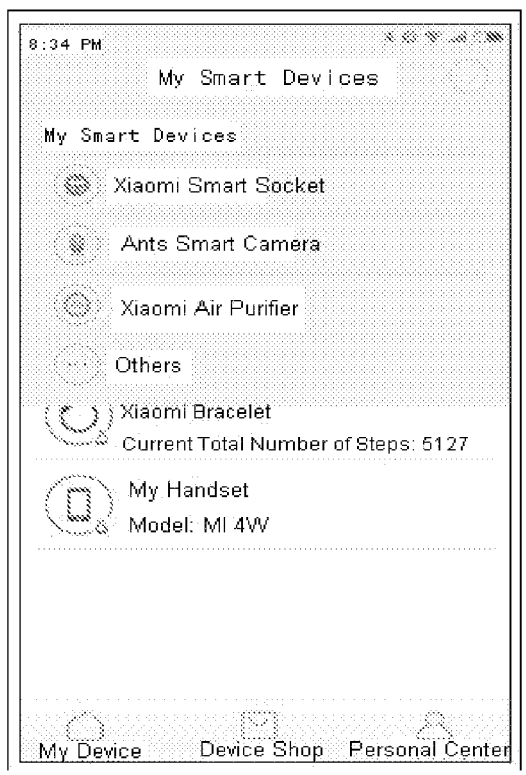
FIG. 6B shows an interface of a smart home application according to an embodiment.

As an example implementation, the control interface for the air purifier may be a control interface for the air purifier in a smart home application, which is installed in the smart handset 54 shown in FIG. 5. The air purifier is bound with a user account of the smart handset 54 and is included in a smart device list of the smart handset 54, which is shown in FIG. 6B. The smart device list is exemplified as including an Ants smart camera, a Xiaomi smart socket and a Xiaomi air purifier, and may include other smart devices in practical use.

Figure 6C:
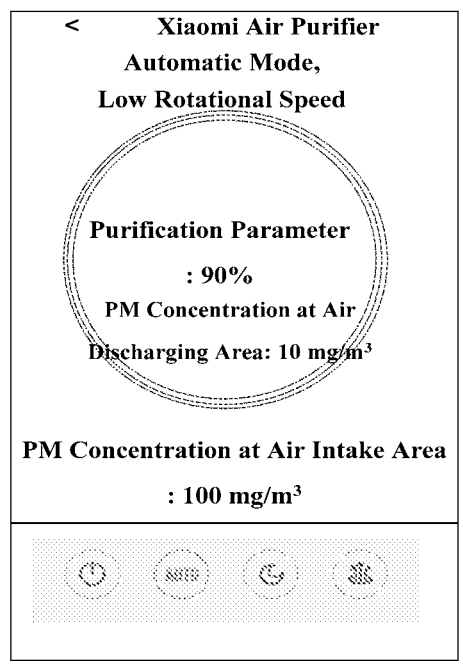
FIG. 6C shows an interface of a smart home application according to another embodiment.

If the purification parameter and the air quality parameters are output to the control interface for the air purifier in the smart home application, a control interface for air purifier shown in FIG. 6C will be displayed after the Xiaomi air purifier shown in FIG. 6B is triggered. By way of example, in the control interface for the air purifier shown in FIG. 6C, the PM concentration in the air intake area is 100 mg/m$^3$, the PM concentration in the air discharging area is 10 mg/m$^3$, and the purification parameter is 90%. The buttons at the bottom of the control interface shown in FIG. 6C are control buttons for the air purifier, including a stop/start button, an automatic mode button, a sleeping mode button and a powerful mode button from the left to the right. If a triggering operation on the above control button is detected, a corresponding control instruction may be sent to the air purifier. In practical application, the interface layout and types of the purification parameter and the air quality parameters may be changed.

In other embodiments of this disclosure, if the parameter detecting method for an air purifier is applied to another smart terminal different from the smart handset 54 shown in FIG. 5 and if the air quality detecting devices 52, 53 are not built in the other smart terminal or the other smart terminal is not wirelessly connected with the air quality detecting devices 52, 53, then acquiring the air quality parameter of the air intake area of the air purifier and the air quality parameter of the air discharging area of the air purifier may comprise: logging on a preset server based on a user logon account; and reading, from the preset server that is logged on, the air quality parameter of the air intake area and the air quality parameter of the air discharging area stored in correspondence to the air purifier, where the air quality parameter of the air intake area and the air quality parameter of the air discharging area are pushed by a preset pushing terminal to the preset server in real time. The preset pushing terminal may be the air quality detecting devices 52, 53 or the smart handset 54. By reading from the preset server that is logged on the air quality parameter of the air intake area and the air quality parameter of the air discharging area stored corresponding to the air purifier, the terminal does not need to acquire air quality parameters in real time, the purification parameter can be detected quickly and conveniently, and the efficiency of detecting the purification parameter can be improved.

Correspondingly to the embodiments of the parameter detecting method for an air purifier described as above, this disclosure also provides embodiments of a parameter detecting apparatus for an air purifier, and a related terminal.

Figure 7:
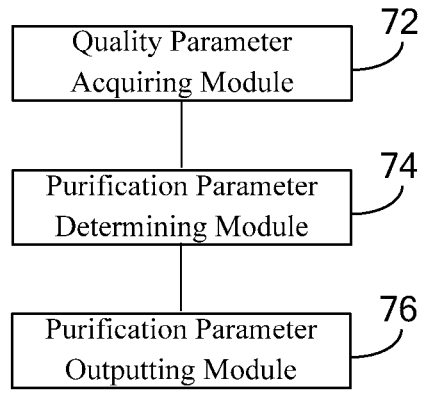
FIG. 7 is a block diagram showing a parameter detecting apparatus for an air purifier according to an embodiment.

FIG. 7 is a block diagram showing a parameter detecting apparatus for an air purifier according to an embodiment. As shown in FIG. 7, the apparatus includes a quality parameter acquiring module 72, a purification parameter determining module 74 and a purification parameter outputting module 76.

The quality parameter acquiring module 72 is configured to acquire at least one air quality parameter of an air intake area of the air purifier and at least one air quality parameter of an air discharging area of the air purifier.

The purification parameter determining module 74 is configured to determine a purification parameter corresponding to the air quality parameter of the air intake area and the air quality parameter of the air discharging area.

The purification parameter outputting module 76 is configured to output the purification parameter.

In the embodiment of the disclosure, by acquiring at least one air quality parameter of an air intake area of an air purifier and at least one air quality parameter of an air discharging area of the air purifier and then determining and outputting a purification parameter corresponding to the at least one air quality parameter of the air intake area and the at least one air quality parameter of the air discharging area, the purification parameter can be detected quickly and accurately. Accordingly, the purification performance of the air purifier can be acquired quickly and accurately, thereby providing reliable bases for controlling and improving the air purifier.

Figure 8:
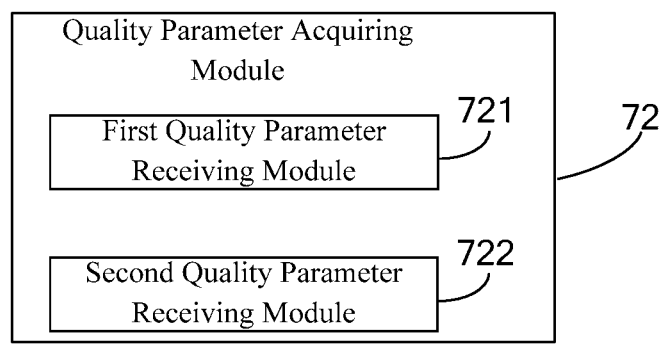
FIG. 8 is a block diagram showing a parameter detecting apparatus for an air purifier according to another embodiment.

FIG. 8 is a block diagram showing a parameter detecting apparatus for an air purifier according to another embodiment. As shown in FIG. 8, based on the embodiment shown in FIG. 7, the quality parameter acquiring module 72 may comprise a first quality parameter receiving module 721 and a second quality parameter receiving module 722.

The first quality parameter receiving module 721 is configured to receive at least one first air quality parameter generated by an air quality detecting device provided at the air intake area.

The second quality parameter receiving module 722 is configured to receive at least one second air quality parameter generated by an air quality detecting device provided at the air discharging area.

In the embodiment of the disclosure, by receiving air quality parameters generated by air quality detecting devices, the air quality parameters can be measured quickly and accurately, and the efficiency of measuring the purification parameter can be improved accordingly.

Figure 9:
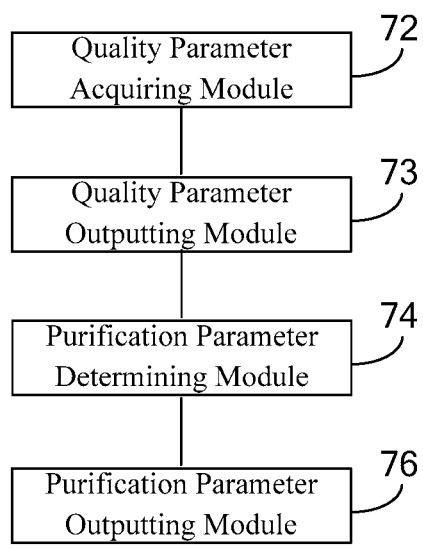
FIG. 9 is a block diagram showing a parameter detecting apparatus for an air purifier according to yet another embodiment.

FIG. 9 is a block diagram showing a parameter detecting apparatus for an air purifier according to yet another embodiment. As shown in FIG. 9, based on the embodiment shown in FIG. 7, the apparatus may comprise a quality parameter outputting module 73.

The quality parameter outputting module 73 is configured to output the air quality parameter of the air intake area and the air quality parameter of the air discharging area to a control interface for the air purifier.

In the embodiment of the disclosure, by outputting the air quality parameters to the control interface for the air purifier for display, the purification performance of the air purifier can be conveniently presented to users, and user experience can be effectively enhanced.

Figure 10:
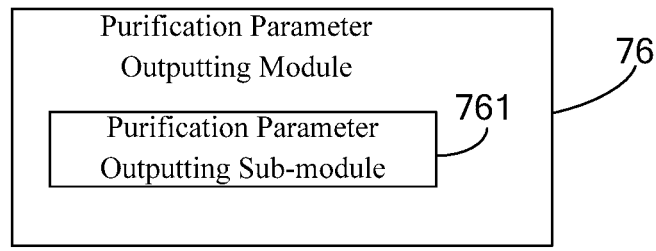
FIG. 10 is a block diagram showing a parameter detecting apparatus for an air purifier according to yet another embodiment.

FIG. 10 is a block diagram showing a parameter detecting apparatus for an air purifier according to yet another embodiment. As shown in FIG. 10, based on the embodiment shown in FIG. 9, the purification parameter outputting module 76 may comprise a purification parameter outputting sub-module 761.

The purification parameter outputting sub-module 761 is configured to output the purification parameter to the control interface for the air purifier.

In the embodiment of the disclosure, by outputting the purification parameter to the control interface for the air purifier for display, the purification performance of the air purifier can be conveniently presented to users, and user experience can be effectively enhanced.

Figure 11:
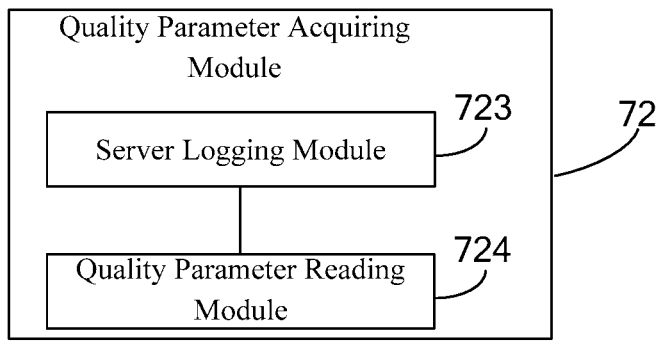
FIG. 11 is a block diagram showing a parameter detecting apparatus for an air purifier according to yet another embodiment.

FIG. 11 is a block diagram showing a parameter detecting apparatus for an air purifier according to yet another embodiment. As shown in FIG. 11, based on the embodiment shown in FIG. 7, the quality parameter acquiring module 72 may further comprise a server logging module 723 and a quality parameter reading module 724.

The server logging module 723 is configured to log on a preset server based on a user logon account.

The quality parameter reading module 724 is configured to read from the preset server that is logged on the air quality parameter of the air intake area and the air quality parameter of the air discharging area stored in correspondence to the air purifier, where the air quality parameter of the air intake area and the air quality parameter of the air discharging area are pushed by a preset pushing terminal to the preset server in real time.

In the embodiment of the disclosure, by reading from the preset server that is logged on the at least one air quality parameter of the air intake area and the at least one air quality parameter of the air discharging area stored in correspondence to the air purifier, the terminal does not need to acquire air quality parameters in real time, the purification parameter can be detected quickly and conveniently, and the efficiency of detecting the purification parameter can be improved.

Figure 12:
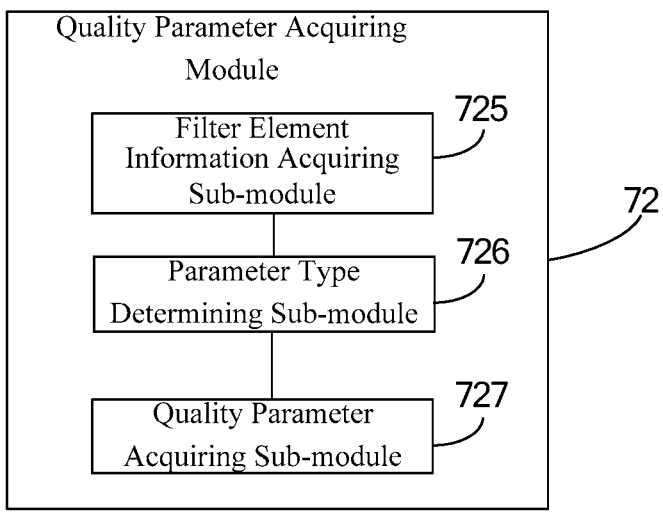
FIG. 12 is a block diagram showing a parameter detecting apparatus for an air purifier according to yet another embodiment.

FIG. 12 is a block diagram showing a parameter detecting apparatus for an air purifier according to yet another embodiment. As shown in FIG. 12, based on the embodiment shown in FIG. 7, the quality parameter acquiring module 72 may further comprise a filter element information acquiring sub-module 725, a parameter type determining sub-module 726 and a quality parameter acquiring sub-module 727.

The filter element information acquiring sub-module 725 is configured to acquire filter element type information of the air purifier.

The parameter type determining sub-module 726 is configured to determine at least one parameter type corresponding to the filter element type information.

The quality parameter acquiring sub-module 727 is configured to acquire the air quality parameter of the air intake area corresponding to the at least one parameter type and the air quality parameter of the air discharging area corresponding to the at least one parameter type.

In the embodiment of the disclosure, based on the filter element type information of the air purifier, the corresponding type of air quality parameters of the filter element can be acquired quickly and accurately, and the efficiency of detecting the purification parameter can be improved.

Figure 13:
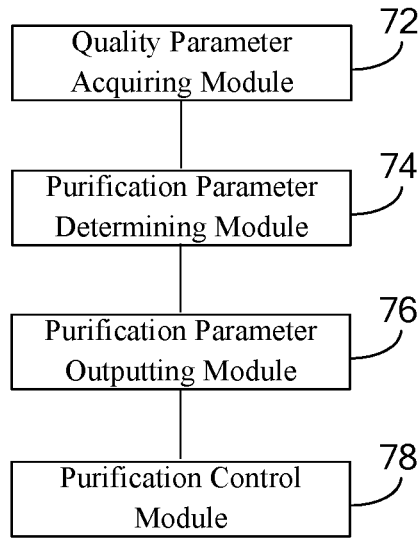
FIG. 13 is a block diagram showing a parameter detecting apparatus for an air purifier according to yet another embodiment.

FIG. 13 is a block diagram showing a parameter detecting apparatus for an air purifier according to yet another embodiment. As shown in FIG. 13, based on the embodiment shown in FIG. 7, the apparatus may further comprise a purification control module 78.

The purification control module 78 is configured to perform control of the air purifier based on the purification parameter, the control including adjusting a fan rotational speed and/or an operation mode of the air purifier.

In the embodiment of the disclosure, by performing control of the air purifier based on the purification parameter, the control efficiency and intelligent level of the air purifier can be improved, a better purification effect can be achieved and user experience can be enhanced.

Figure 14:
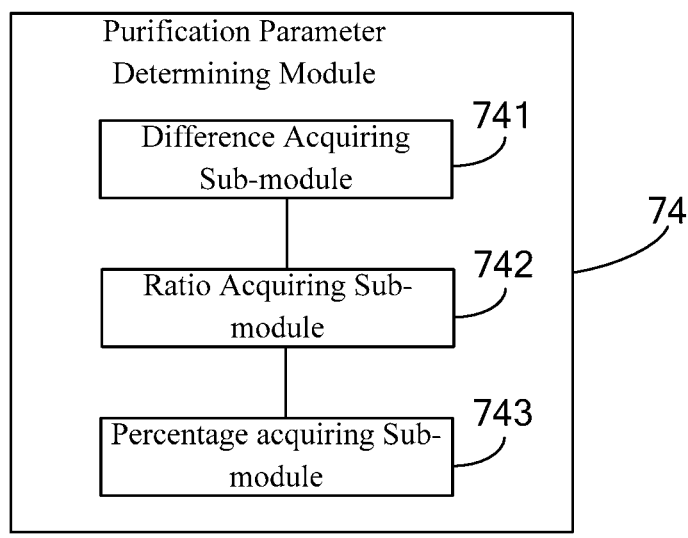
FIG. 14 is a block diagram showing a parameter detecting apparatus for an air purifier according to yet another embodiment.

FIG. 14 is a block diagram showing a parameter detecting apparatus for an air purifier according to yet another embodiment. As shown in FIG. 14, based on the embodiment shown in FIG. 7, the purification parameter determining module 74 may comprise a difference acquiring sub-module 741, a ratio acquiring sub-module 742 and a percentage acquiring sub-module 743.

The difference acquiring sub-module 741 is configured to calculate a difference between the air quality parameter of the air intake area and the air quality parameter of the air discharging area.

The ratio acquiring sub-module 742 is configured to calculate a ratio of the difference to the air quality parameter of the air intake area.

The percentage acquiring sub-module 743 is configured to convert the ratio into a percentage and take the percentage as the purification parameter.

In the embodiment of the disclosure, by calculating a difference between the at least one air quality parameter of the air intake area and the at least one air quality parameter of the air discharging area, calculating a ratio of the difference to the at least one air quality parameter of the air intake area, and converting the ratio into a percentage and taking the percentage as the purification parameter, operations for detecting the purification parameter can be simplified, and the purification parameter can be detected quickly and accurately (namely, the detecting efficiency can be improved).

With respect to the apparatuses in the above embodiments, the specific manners for performing operations for individual modules therein have been described in detail in the embodiments regarding the related methods, and will not be elaborated herein.

Since the apparatus embodiments substantially correspond to the method embodiments, similar parts of the method embodiments may be referred to for the apparatus embodiments. The above apparatus embodiments are illustrative only. The modules described as separate members may or may not be physically separated. The members described as modules may be or may not be physical modules, may be located at the same place or may be distributed in multiple network areas. The objectives of the solutions of this disclosure may be achieved by selecting some or all of the modules according to the actual needs, as can be appreciated and implemented by those skilled in the art without any inventive work.

Accordingly, this disclosure also provides a terminal including: a processor; and a memory storing instructions executable by the processor. The processor is configured to: acquire at least one air quality parameter of an air intake area of an air purifier and at least one air quality parameter of an air discharging area of the air purifier; determine a purification parameter corresponding to the air quality parameter of the air intake area and the air quality parameter of the air discharging area; and output the purification parameter.

Figure 15:
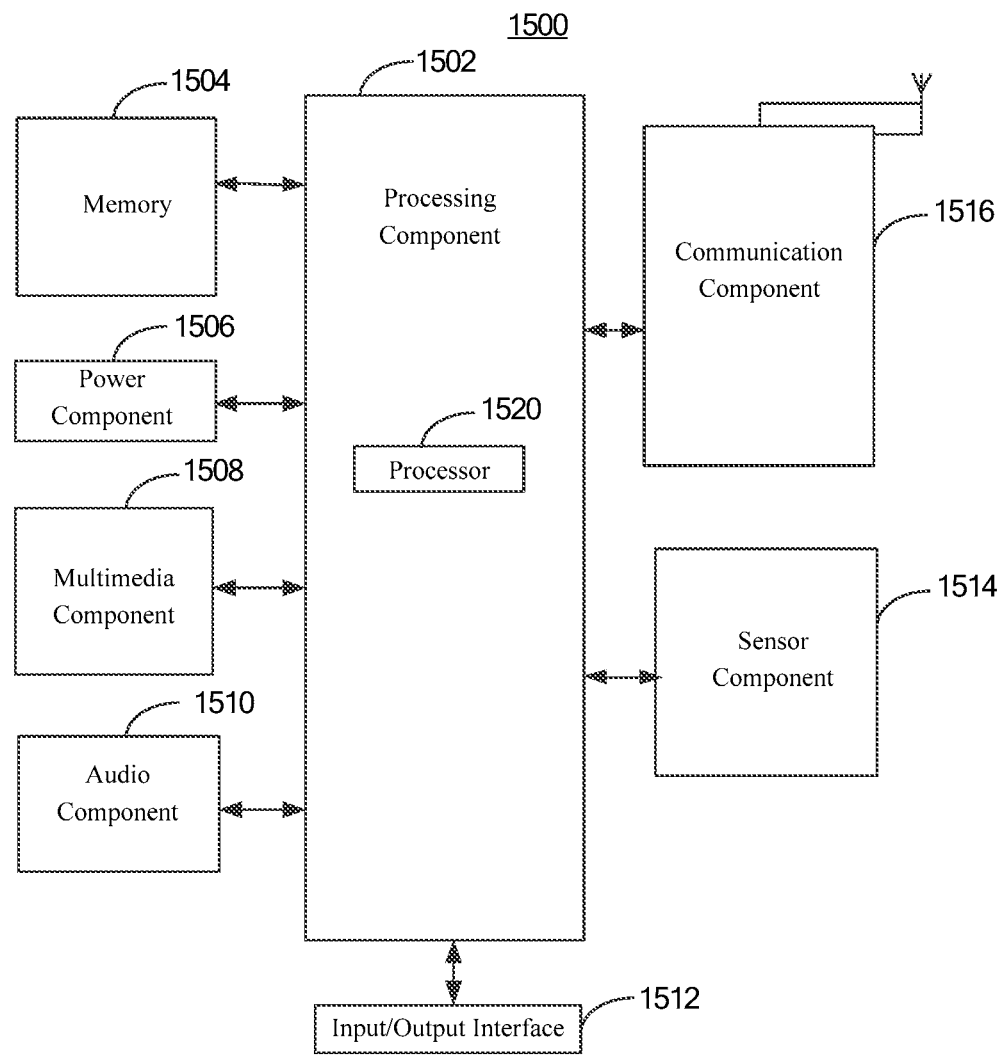
FIG. 15 is a schematic structural view of a parameter detecting apparatus for an air purifier according to an embodiment.

FIG. 15 is a schematic structural view of a parameter detecting apparatus 1500 for an air purifier according to an embodiment. For example, the apparatus 1500 may be a mobile phone, a computer, a digital broadcast terminal, a messaging device, a gaming console, a tablet, a medical device, exercise equipment, a personal digital assistant or the like.

Referring to FIG. 15, the apparatus 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the apparatus 1500, such as the operations associated with display, telephone calls, data communications, camera operations, and recording operations. The processing component 1502 may include one or more processors 1520 to execute instructions to perform all or part of the steps in the above described methods. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the apparatus 1500. Examples of such data include instructions for any applications or methods operated on the apparatus 1500, contact data, phonebook data, messages, pictures, video, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the apparatus 1500. The power component 1506 may include a power management system, one or more power sources, and any other components associated with the generation, management, and distribution of power in the apparatus 1500.

The multimedia component 1508 includes a screen providing an output interface between the apparatus 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front camera and/or a rear camera. The front camera and the rear camera may receive an external multimedia datum while the apparatus 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone ("MIC") configured to receive an external audio signal when the apparatus 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, buttons, and the like. The buttons may include, but are not limited to, a home button, a volume button, a starting button, and a locking button.

The sensor component 1514 includes one or more sensors to provide status assessments of various aspects of the apparatus 1500. For instance, the sensor component 1514 may detect an open/closed status of the apparatus 1500, relative positioning of components, e.g., the display and the keypad, of the apparatus 1500, a change in position of the apparatus 1500 or a component of the apparatus 1500, a presence or absence of user contact with the apparatus 1500, an orientation or an acceleration/deceleration of the apparatus 1500, and a change in temperature of the apparatus 1500. The sensor component 1514 may include a proximity sensor configured to detect the presence of nearby objects without any physical contact. The sensor component 1514 may also include a light sensor, such as a CMOS or CCD image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate communication, wired or wirelessly, between the apparatus 1500 and other devices. The apparatus 1500 can access a wireless network based on a communication standard, such as WiFi, 2G, or 3G, or a combination thereof. In one embodiment, the communication component 1516 receives a broadcast signal or broadcast associated information from an external broadcast management system via a broadcast channel. In one embodiment, the communication component 1516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 1500 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit in the disclosure may be implemented at least partially using the one or more circuitries.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method, comprising:

acquiring, by an air purifier a filter element type information of the air purifier, at least one intake air quality parameter of an air intake area of the air purifier and at least one output air quality parameter of an air discharging area of the air purifier;

determining, by the air purifier, a purification parameter corresponding to the at least one intake air quality parameter of the air intake area and the at least one output air quality parameter of the air discharging area, and determining an at least one purification parameter type corresponding to the filter element type information;

acquiring, by a purification parameter determining module of the air purifier, the at least one intake air quality parameter of the air intake area corresponding to the at least one purification parameter type and the at least one output air quality parameter of the air discharging area corresponding to the at least one purification parameter type; and outputting, by the air purifier, the purification parameter for displaying in a control interface for the air purifier.

2. The method of claim 1, wherein acquiring the at least one intake air quality parameter of the air intake area of the air purifier and the at least one output air quality parameter of the air discharging area of the air purifier comprises:

receiving at least one first air quality parameter generated by an air quality detecting device provided at the air intake area; and receiving at least one second air quality parameter generated by an air quality detecting device provided at the air discharging area.

3. The method of claim 1, wherein after acquiring the at least one intake air quality parameter of the air intake area of the air purifier and the at least one output air quality parameter of the air discharging area of the air purifier, the method further comprises:

outputting the at least one intake air quality parameter of the air intake area and the at least one output air quality parameter of the air discharging area to a control interface for the air purifier.

4. The method of claim 3, wherein outputting the purification parameter comprises outputting the purification parameter to the control interface for the air purifier.

5. The method of claim 1, wherein acquiring the at least one intake air quality parameter of the air intake area of the air purifier and the at least one output air quality parameter of the air discharging area of the air purifier comprises:

logging on a preset server based on a user logon account; and reading, from the preset server that is logged on, the at least one intake air quality parameter of the air intake area and the at least one output air quality parameter of the air discharging area stored in correspondence to the air purifier, wherein the at least one intake air quality parameter of the air intake area and the at least one output air quality parameter of the air discharging area are pushed by a preset pushing terminal to the preset server in real time.

6. The method of claim 1, wherein after determining the purification parameter corresponding to the at least one intake air quality parameter of the air intake area and the at least one output air quality parameter of the air discharging area, the method further comprises:

performing control of the air purifier based on the purification parameter, the control including adjusting at least one of a fan rotational speed and an operation mode of the air purifier.

7. The method of claim 1, wherein determining the purification parameter corresponding to the at least one intake air quality parameter of the air intake area and the at least one output air quality parameter of the air discharging area comprises:

calculating a difference between the at least one intake air quality parameter of the air intake area and the at least one output air quality parameter of the air discharging area;

calculating a ratio of the difference to the at least one intake air quality parameter of the air intake area; and converting the ratio into a percentage and taking the percentage as the purification parameter.

8. The method of claim 1, wherein the parameter type comprises at least one of following types: a particulate matter (PM) type, a toxic gas type, and a bacteria type.

9. An apparatus, comprising
a processor; and
a memory storing instructions executable by the processor,
wherein the processor is configured to:

acquire a filter element type information of an air purifier, at least one intake air quality parameter of an air intake area of the air purifier and at least one output air quality parameter of an air discharging area of the air purifier;

determine a purification parameter corresponding to the at least one intake air quality parameter of the air intake area and the at least one output air quality parameter of the air discharging area, and determine an at least one purification parameter type corresponding to the filter element type information;

acquiring, the at least one intake air quality parameter of the air intake area corresponding to the at least one purification parameter type and the at least one output air quality parameter of the air discharging area corresponding to the at least one purification parameter type; and output the purification parameter for displaying in a control interface for the air purifier.

10. The apparatus of claim 9, wherein the processor is further configured to: receive at least one first air quality parameter generated by an air quality detecting device provided at the air intake area; and receive at least one second air quality parameter generated by an air quality detecting device provided at the air discharging area.

11. The apparatus of claim 9, wherein the processor is further configured to: after acquiring the at least one intake air quality parameter of the air intake area of the air purifier and the at least one output air quality parameter of the air discharging area of the air purifier, output the at least one intake air quality parameter of the air intake area and the at least one output air quality parameter of the air discharging area to a control interface for the air purifier.

12. The apparatus of claim 11, wherein the processor is further configured to: output the purification parameter to the control interface for the air purifier.

13. The apparatus of claim 9, wherein the processor is further configured to: log on a preset server based on a user logon account; and read, from the preset server that is logged on, the at least one intake air quality parameter of the air intake area and the at least one output air quality parameter of the air discharging area stored in correspondence to the air purifier, wherein the at least one intake air quality parameter of the air intake area and the at least one output air quality parameter of the air discharging area are pushed by a preset pushing terminal to the preset server in real time.

14. The apparatus of claim 9, wherein the processor is further configured to: perform control of the air purifier based on the purification parameter, the control including adjusting at least one of a fan rotational speed and an operation mode of the air purifier.

15. The apparatus of claim 9, wherein the processor is further configured to: calculate a difference between the at least one intake air quality parameter of the air intake area and the at least one output air quality parameter of the air discharging area;

calculate a ratio of the difference to the at least one intake air quality parameter of the air intake area; and convert the ratio into a percentage and taking the percentage as the purification parameter.

16. The apparatus of claim 9, wherein the parameter type comprises at least one of following types: a particulate matter (PM) type, a toxic gas type, and a bacteria type.

17. A non-transitory computer-readable storage medium having stored therein instructions that, when executed by a processor of a mobile terminal, causes the mobile terminal to perform acts comprising: acquiring by a filter element type information, at least one intake air quality parameter of an air intake area of the air purifier and at least one output air quality parameter of an air discharging area of the air purifier; determining a purification parameter corresponding to the at least one intake air quality parameter of the air intake area and the at least one output air quality parameter of the air discharging area, and determining an at least one purification parameter type corresponding to the filter element type information; acquiring, by the air purifier, the at least one intake air quality parameter of the air intake area corresponding to the at least one purification parameter type and the at least one output air quality parameter of the air discharging area corresponding to the at least one purification parameter type; and outputting the purification parameter for displaying in a control interface for the air purifier.

18. The storage medium of claim 17, wherein acquiring the at least one intake air quality parameter of the air intake area of the air purifier and the at least one output air quality parameter of the air discharging area of the air purifier comprises:
receiving at least one first air quality parameter generated by an air quality detecting device provided at the air intake area; and
receiving at least one second air quality parameter generated by an air quality detecting device provided at the air discharging area.

19. The storage medium of claim 17, wherein after acquiring the at least one intake air quality parameter of the air intake area of the air purifier and the at least one output air quality parameter of the air discharging area of the air purifier, the method further comprises:
outputting the at least one intake air quality parameter of the air intake area and the at least one output air quality parameter of the air discharging area to a control interface for the air purifier.

20. The storage medium of claim 19, wherein outputting the purification parameter comprises outputting the purification parameter to the control interface for the air purifier.

* * * * *